(12) United States Patent
Burr et al.

(10) Patent No.: US 8,662,697 B2
(45) Date of Patent: Mar. 4, 2014

(54) SELF-CONTAINED, PORTABLE HEADLAMP, AUTOMATIC BRAKE-LIGHT, AND ARTICULABLE BATTERY SYSTEM

(76) Inventors: Barry J Burr, Mountain View, CA (US); Miriam S. Burr, Claymont, DE (US)

( * ) Notice: Subject to any disclaimer, the term of this patent is extended or adjusted under 35 U.S.C. 154(b) by 239 days.

(21) Appl. No.: 13/077,894

(22) Filed: Mar. 31, 2011

(65) Prior Publication Data

US 2012/0081887 A1 Apr. 5, 2012

Related U.S. Application Data

(60) Provisional application No. 61/319,809, filed on Mar. 31, 2010.

(51) Int. Cl.
*F21L 4/00* (2006.01)

(52) U.S. Cl.
USPC ............ 362/157; 362/473; 362/474; 362/198

(58) Field of Classification Search
USPC .......................................... 362/473, 474, 198
See application file for complete search history.

(56) References Cited

U.S. PATENT DOCUMENTS

| | | | |
|---|---|---|---|
| 6,219,428 B1 * | 4/2001 | Tejeda, Jr. ..................... | 381/334 |
| 6,406,168 B1 * | 6/2002 | Whiting ........................ | 362/473 |
| 6,832,849 B2 * | 12/2004 | Yoneda et al. ................ | 362/551 |
| 2004/0090794 A1 * | 5/2004 | Ollett et al. ................... | 362/555 |
| 2006/0018125 A1 * | 1/2006 | Miller et al. .................. | 362/554 |
| 2007/0247296 A1 * | 10/2007 | Moore et al. .................. | 340/467 |
| 2009/0129069 A1 * | 5/2009 | Grossman ..................... | 362/189 |
| 2009/0185392 A1 * | 7/2009 | Krupa et al. .................. | 362/553 |

* cited by examiner

*Primary Examiner* — Evan Dzierzynski

(74) *Attorney, Agent, or Firm* — Brill Law Office; Jeffrey Brill

(57) ABSTRACT

Embodiments described herein include a portable system for providing lighting, the system includes a power source that comprises multiple electrical power storage cells in an array that is articulable such that the array is attachable to irregular surfaces, and non-planar surfaces. Embodiments further include a light source coupled to the power source, a primary light beam shaper that shapes light from the light source and passes the light to a lens, and a housing that houses the primary light beam shaper and the lens, wherein the housing is a secondary light shaper that changes the field and shape of a light beam emitted from the primary light beam shaper. Further embodiments include an automatic, powered portable light that is turned on when motion is sensed, such as deceleration of an object. The portable light, a switch and a power source are contained in a housing that is easily mounted to an object such as a bicycle.

18 Claims, 7 Drawing Sheets

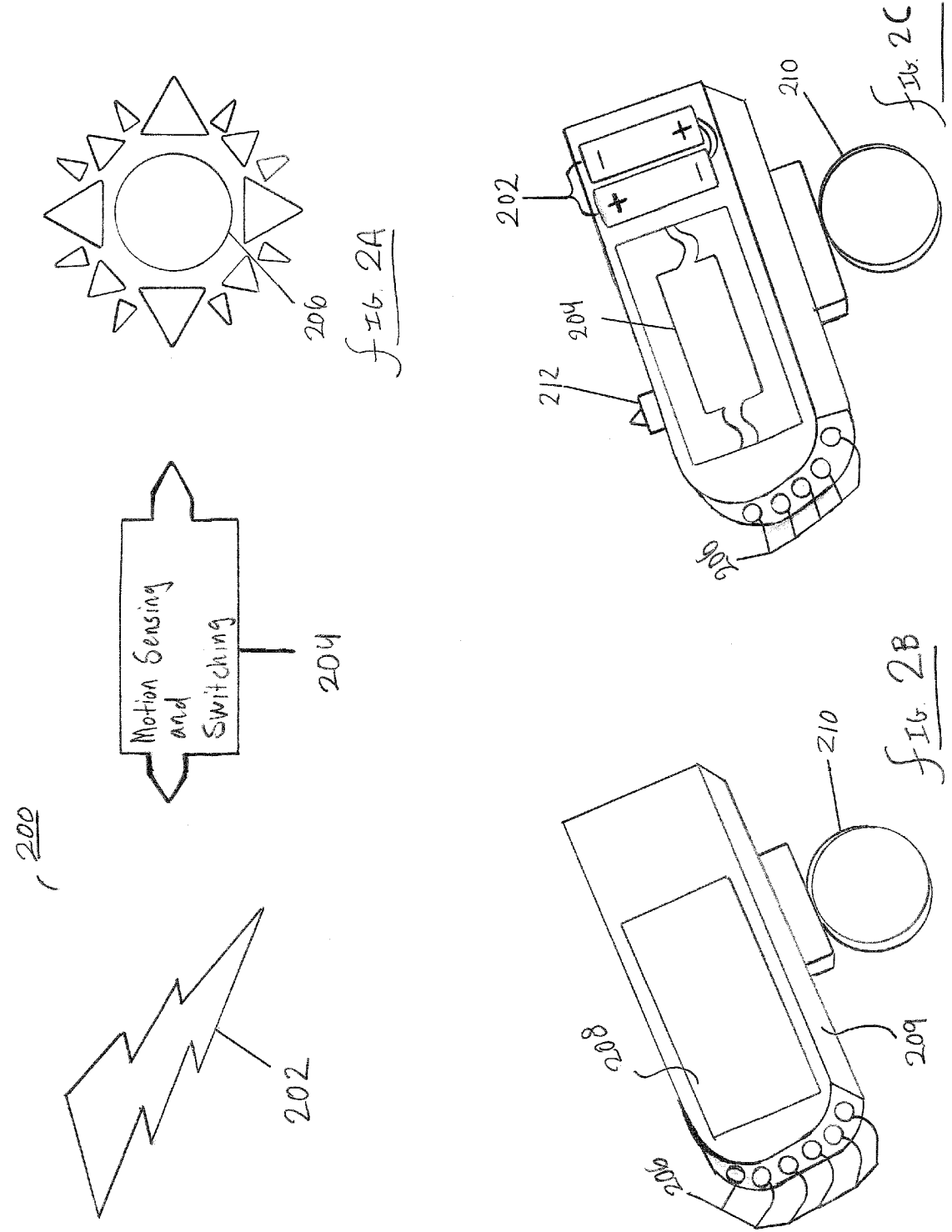

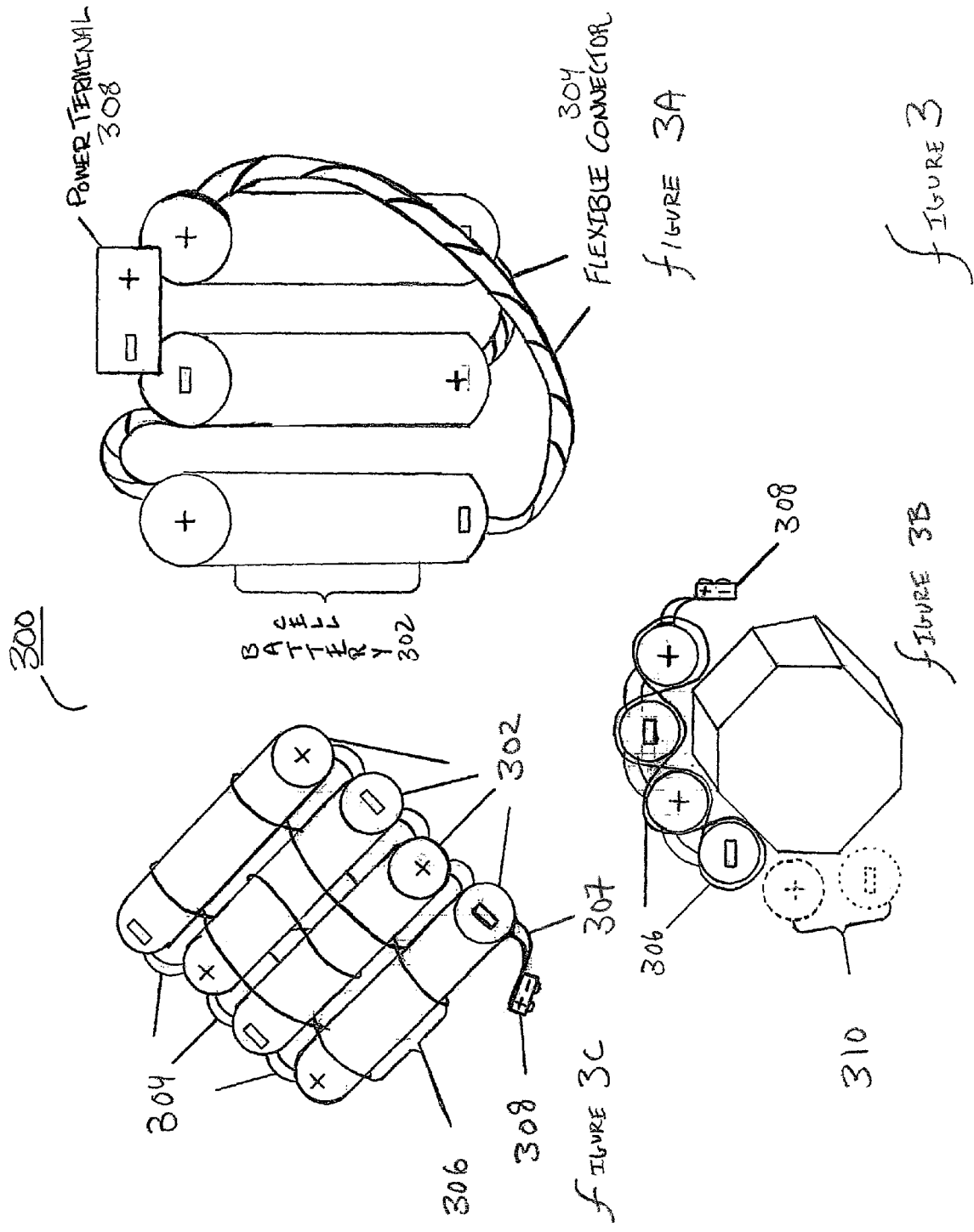

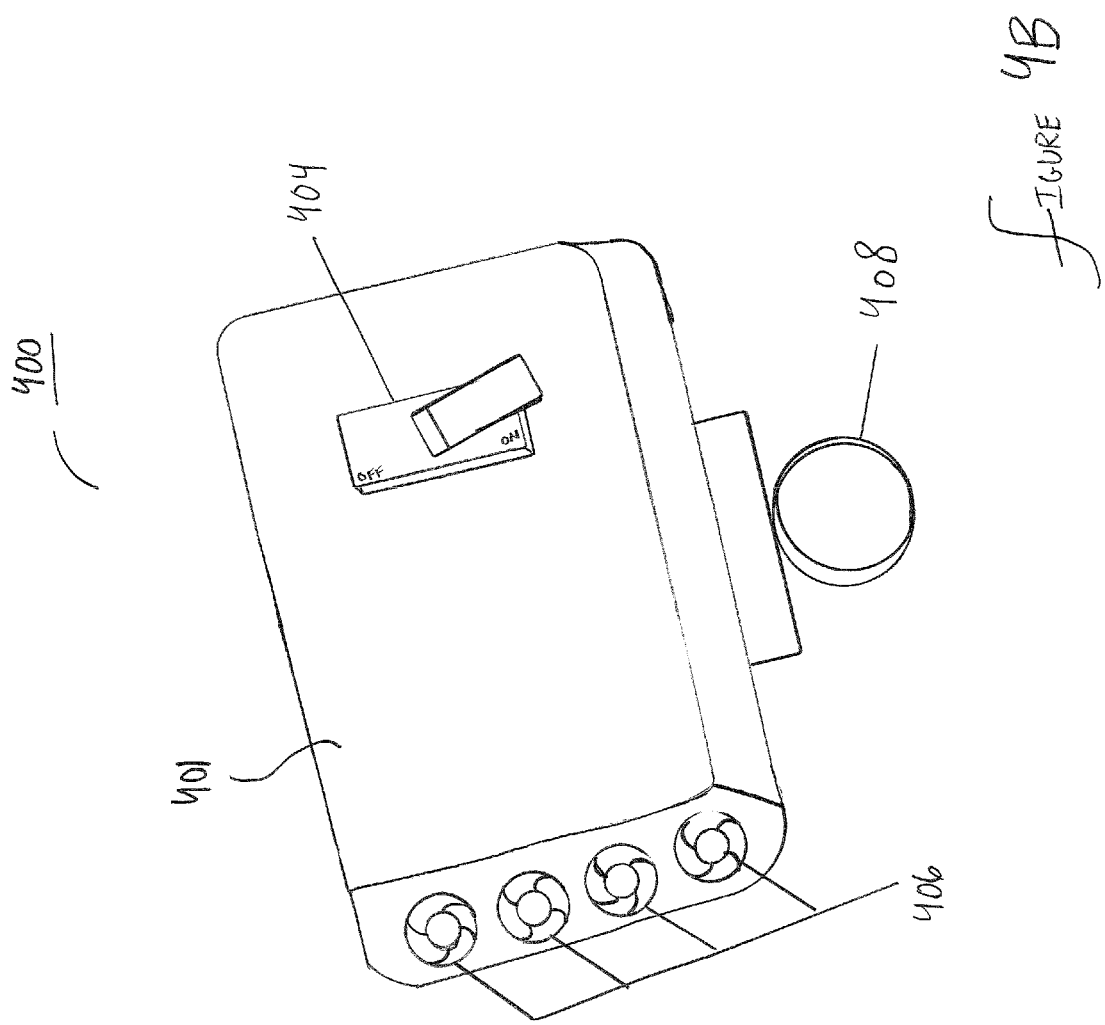

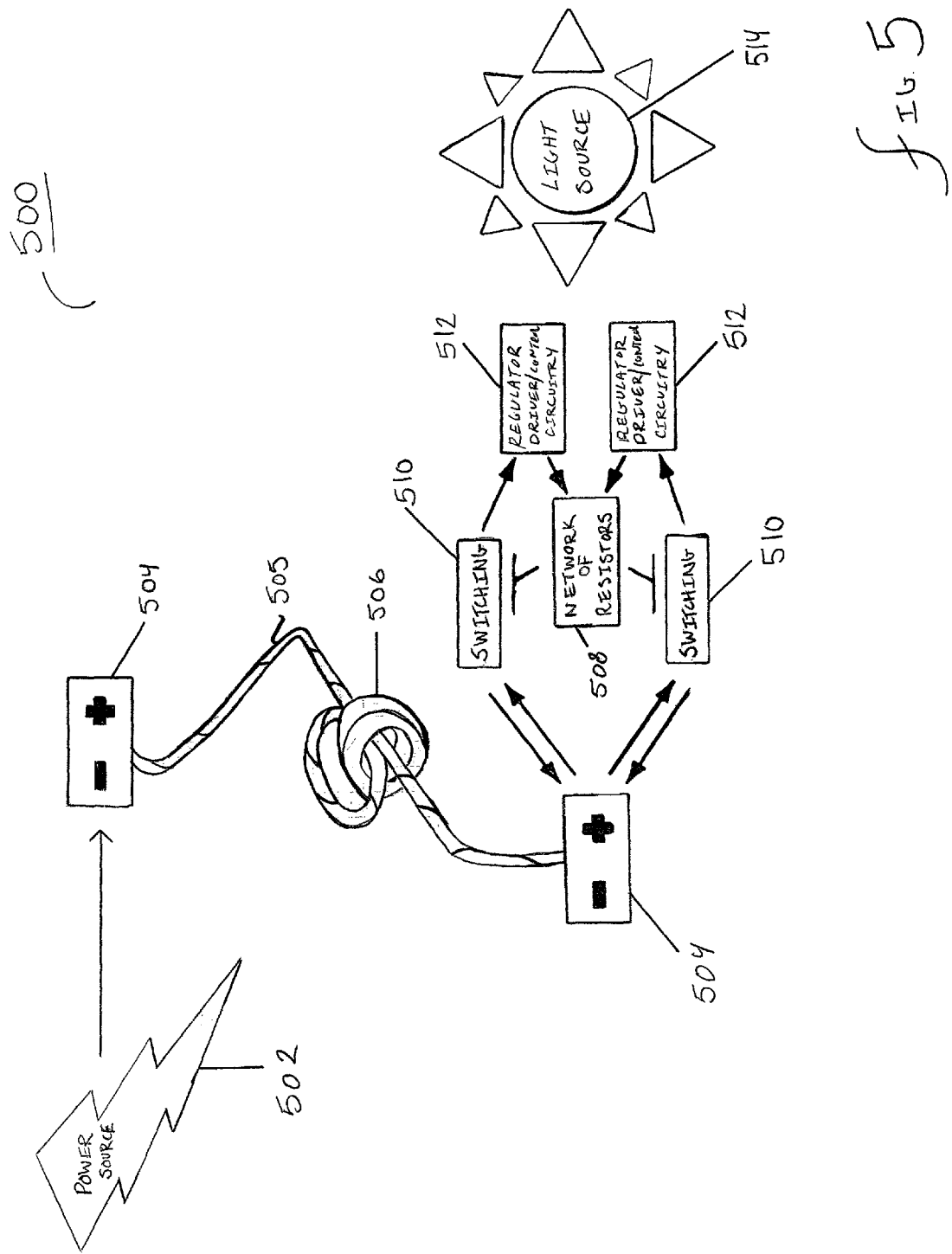

SELF-CONTAINED, PORTABLE HEADLAMP, AUTOMATIC BRAKE-LIGHT, AND ARTICULABLE BATTERY SYSTEM

RELATED APPLICATIONS

This application claims priority from U.S. Provisional Patent Application No. 61/319,809, filed Mar. 31, 2010, which is incorporated by reference in its entirety herein.

BACKGROUND

There exists a large demand among bicyclists for headlamps, taillights and brake lights. All of these devices require a power source typically in the form of a battery.

Currently many different lighting solutions exist for bicycle headlamps and taillights. These include light-emitting diode (LED) systems. LED headlamps and tail lights usually consist of groups or banks of individual LEDs, and are usually configured in a geometric pattern. However, these existing lighting solutions have several disadvantages. For example, typically the light produced by current lighting systems is not properly formed to serve the intended purpose. As one example, LED headlamps tend to emit narrowly focused beams of light. These narrow beams of light illuminate less of the observed scene than would a broader beam such as that produced by a car headlight. Furthermore, the bicyclist is less visible to others on the road including pedestrians, other bicyclists and cars. To the extent that broader beam solutions are available, they tend to require large amounts of power, generate large amounts of heat, and can disperse light more widely than is needed for the target area.

Another growing need for bicyclists is an affordable, easily removable, and automated brake indicator light. Lack of brake indicator lights makes it difficult for a following vehicle to detect whether a bicyclist is slowing down, stopping, or decelerating before a turn. The solutions that are currently available for automatic brake lights on bicycles require a sensor attached to the wheels or bicycle braking system to sense either deceleration, the depression of the brake lever, or other movement in the braking system such as movement of a cable or caliper. These systems can be complex to install. The sensor is typically placed some distance from the brake lights themselves, which requires wiring that is cumbersome and decreases reliability. This makes the brake light more failure prone, and usable only on one bicycle, as the wiring and switching tends to be very difficult to transfer from bicycle to bicycle. In addition, existing brake light systems are relatively expensive, considering that these are items that can easily be stolen, lost or damaged.

Current power sources for electronic bicycle components (for example, lights and cyclometers) include batteries, and pedal, hub, or friction generators. The type of power source can vary depending upon the type of component and its design. If the component requires more power than a coin cell battery can provide, larger battery cells must be accommodated. As bicyclists use more power-consuming devices, the need increases for an affordable multiple-cell power source that can be articulated, shaped, and easily mounted to the different non-planar surfaces of a bicycle. It would also be desirable to have such a power source that allows for the addition of more battery cells if needed.

Bicyclists also require the ability to emit sounds that make their presence known to other vehicles and pedestrians. Traditional solutions include handle-bar mountable bells. If the person(s) the bicyclist is trying to put on notice is a pedestrian, the bell may be effective. However, if the person(s) is in a vehicle it is very unlikely that they can be effectively warned of the bicyclist's presence with nothing more than a soft ringing tone.

BRIEF DESCRIPTION OF THE DRAWINGS

FIG. 2A is a diagram illustrating the components of an automatic brake light system.

FIG. 2B is a diagram of assembled automatic brake light components 2A.

FIG. 2C is a diagram of assembled automatic brake light components 2A with the assembly lid removed.

FIGS. 3A-3C are diagrams showing the components of an articulable and expandable battery pack.

FIG. 4B is a diagram of assembled compact electronic horn and siren, according to an embodiment.

FIG. 5 is a diagram of a lighting system according to an embodiment.

DETAILED DESCRIPTION

Embodiments of the invention include a secondary light shaper bicycle head-light, automatic brake light system, an articulable and expandable battery array and a compact electronic horn and siren system.

Figure 1:
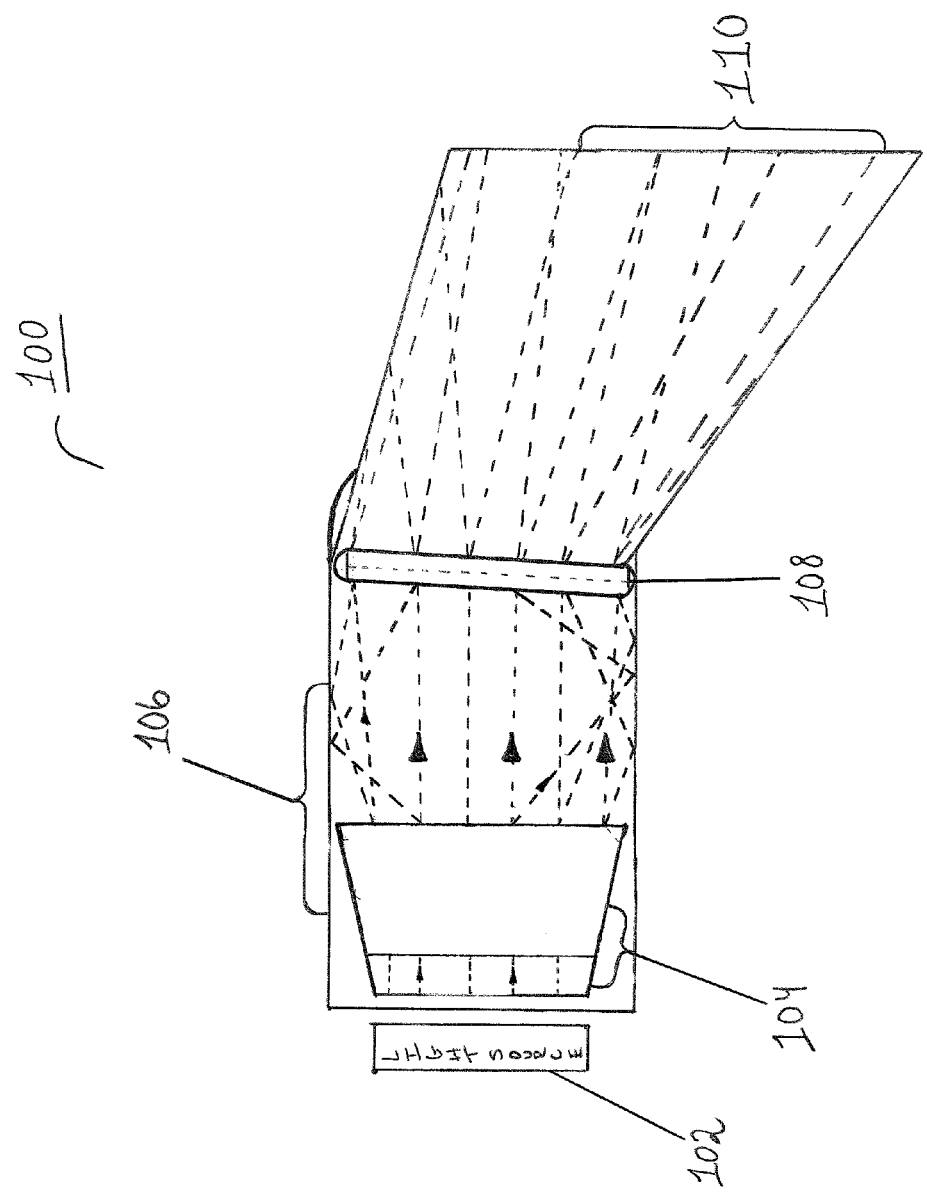
FIG. 1 is a diagram of a light system according to an embodiment.

FIG. 1 is an illustration of a diagram of a light system 100 according to an embodiment. System 100 includes a light source 102. Light source 102 is connected to a housing 106. Within or connected to housing 106 is a primary light shaping collimator 104. Housing 106 acts as a secondary light shaper. Housing and secondary light shaper 106 can be comprised of fully or partially smooth, textured, transparent, diffused, reflective, colored, or photo luminescent material depending on the optical effect intended. The housing and secondary light shaper 106 includes a lens 108 which, in some embodiments is a magnifying lens. After the light beam has traveled from the light source 102, and through primary light shaper 104 and through housing and secondary light shaper 106, the reshaped beam 110 is projected onto the intended surface.

FIG. 2A is a diagram of the components of an automatic motion sensing brake-light system. System 200 includes a power source 202, a motion sensing switch 204 which may also sense angles in multiple planes, and a light source 206. The power source 202 is constantly emitting power to the motion sensor and switch 204. The power source 202 in various embodiments may be battery cells or a generator arrangement. When motion sensor and switch 204 detects deceleration it allows power source 202 to flow its current through switch 204 to the light source 206. Motion sensor and switch 204 can be designed to trigger the light source 206 to multiple states which can include a blink, a change of color, pattern, or intensity, singly or in combination, at randomly or regularly variable rates or to project solidly. The motion sensor and switch 104 in various embodiments may be a solid-state semiconductor motion sensor, or a lower cost mercury sensor, and may include additional circuitry to provide or refine exact desired state changing behavior.

FIG. 2B is a diagram of assembled automatic brake light system 200. In FIG. 2B, a lid 208 covers various components of the system that are assembled into a housing 209. Light sources 206 in an embodiment include multiple light bulbs or LEDs. In other embodiments, light source 206 may be a single light source or light source array that emits light through openings in the system cover, or through a lens that is part of the system cover. Some embodiments may include beam shaping as in FIG. 1. System 200 is attached to (as just one example) a bicycle using a fastening apparatus 210.

FIG. 2C is a diagram of assembled automatic brake light system 200 with the top cover 208 removed. Motion sensing and switching components 204 reside inside or attach to the housing, as may power source 202. An optional ON/OFF switch 212 allows the system to be disabled or enabled.

Referring to FIG. 3A, system 300 includes battery cells 302, flexible connectors 304 and power terminal 308. Battery cells 302 can be expanded to include as many battery cells as desired. Upon expansion additional flexible connectors 304 are utilized to connect the current between the cells.

Referring to FIG. 3B, flexible straps 306 which may be any combination of elastomer, plastic, or other material, connect the battery cells in the articulable and expandable battery array. Flexible straps 306 allow for battery cells 302 to be easily fastened to non-planar, uneven surfaces. Also contemplated, are additional battery cells 310 which can be added as desired to the extent that there is room for them on the surface. In addition, layers of battery cells may be stacked on each other.

Referring to FIG. 3C, a top view of the articulable battery array with four battery cells 302 (as an example) is shown. Included are flexible straps 306, power terminal 308 which may be attached to a power cable 307 extending from the battery and flexible connectors 304.

Figure 4A:
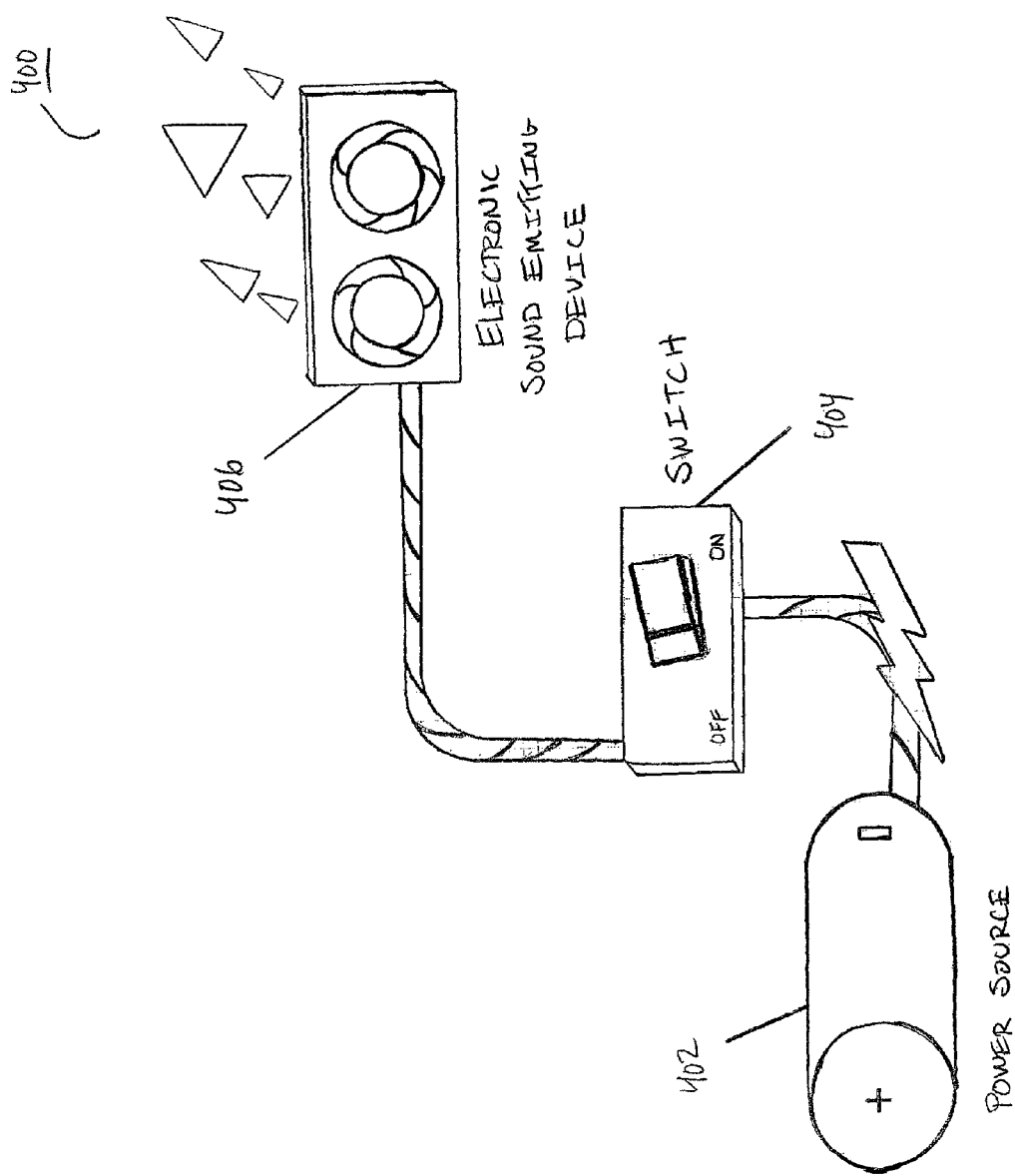
FIG. 4A is a diagram of a compact electronic horn and siren system.

FIG. 4A is an illustration of a compact electronic bicycle horn and siren system 400. System 400 includes a power source 402, a switch 404, which may be a momentary contact type switch, and an electronic sound emitting device 406.

FIG. 4B is an illustration of system 400 assembled with a chassis or container 401 to which other components (not shown) may be assembled. A mount 408 is usable to attach the system 400 and chassis 401 to a bicycle frame, although the system 400 and chassis 401 may alternatively be mounted on any kind of unit. When switch 404 is turned to the on position by the user, power flows from power source 402 to electronic sound emitting device 406. Electronic sound emitting device 406 can be designed to emit variable volumes of horn and siren sounds, or any sort of sound.

FIG. 5 is a diagram of a lighting system 500 according to an embodiment.

System 500 includes a power source 502, power terminals 504. Resistor network 508, switching units 510, regulator/driver/control circuitry 512 and light source 514. Power cables 505 in an embodiment are twisted pairs of wires with an elastomer shrink coating and wrap around a ferrite core 506. The twisted pair cable is stronger than a straight wire cable, and emits less radio frequency interference. In addition twisted pair cable is lighter, thinner, more flexible, more break resistant, experiences less power loss over a give distance, and is more easily terminated than straight wire cable or coaxial cable.

Cables 505 can be terminated with 9 volt battery style snap connectors, which can be coated in shrinkable elastomer material or other means to make them water resistant. The coating can overlap the coating on the wiring and be heated, then cooled, to set the connection and cable in a desired shape. This connector style and reinforcing is more pull resistant than linear pressure connecting or barrel or multiple pin type connectors that other lights use.

Individually wired multiple regulator/driver/control circuitry 512 with secondary switches can be used, allowing for redundancy and reliability against light loss due to failed circuitry or broken solder connections. The regulator/driver/control circuitry 512 allows finer light gradation control, and control of power consumption. Separate ranges of power settings can be included. Switching units 510 can direct current through a resistor network 508 to obtain different outputs from control circuitry 512.

The switches, resistor banks, regulator/driver/control circuitry, and other components and circuitry can be mounted on sockets or connectors. This provides the ability to more easily service and repair the device or change output for switch positions via simplified access to, removal and replacement of components wiring.

Figure 6:
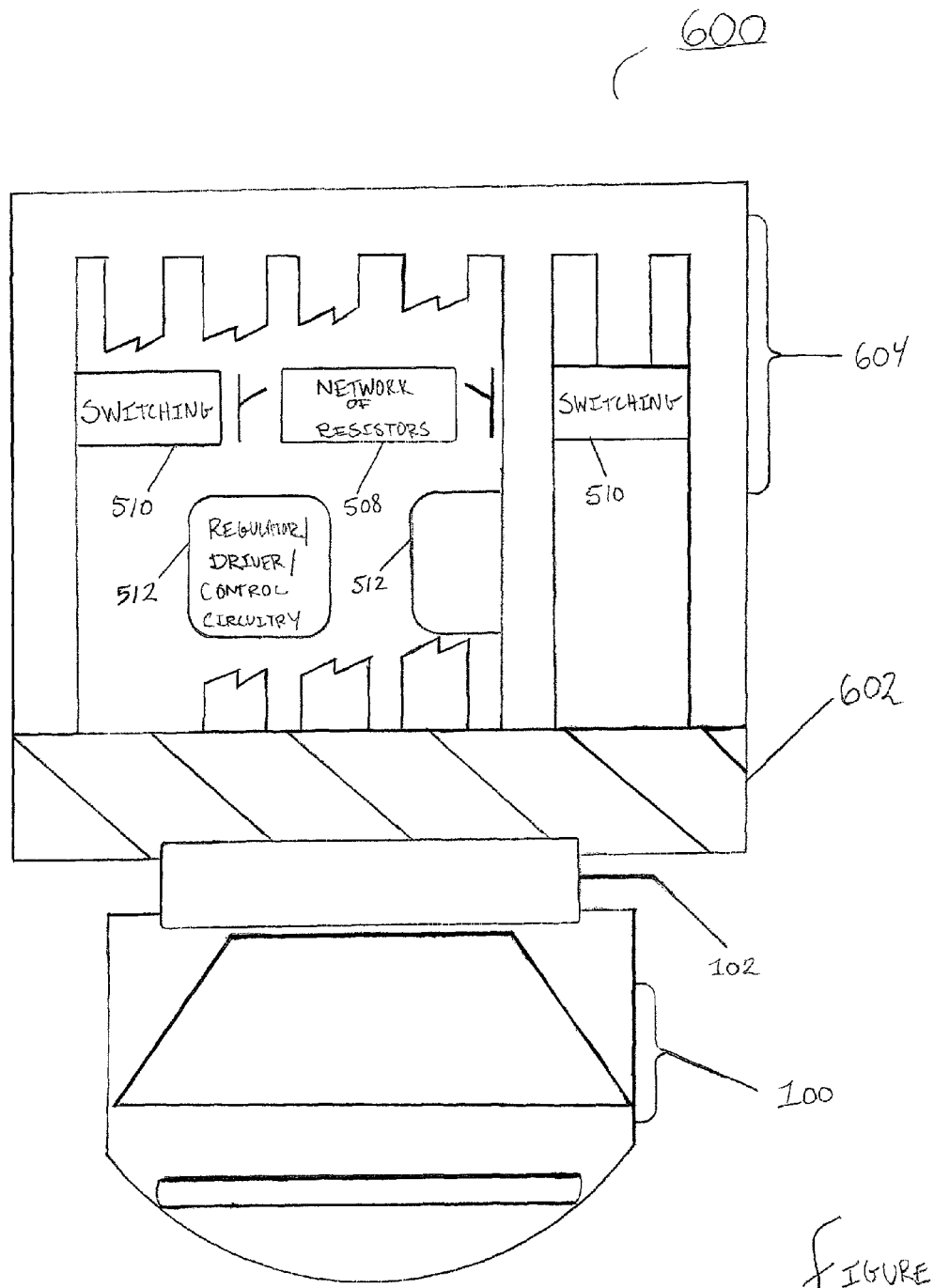
FIG. 6 is a diagram of a component layout for a lighting system including a heat sink, according to an embodiment.

FIG. 6 is a diagram of a component layout for a lighting system 600 including a heat sink. System 600 includes the system 100 with light source 102 as in FIG. 1. In addition a mounting surface heat sink 602 and a secondary heat sink 604 provide cooling of the electronic components of the compact electronic horn and siren system 600, according to an embodiment. Airspace behind the mounting surface heat sink 602 may house various components as shown. Additional heat sink 604, in an embodiment, resembles a cage of cooling fins surrounding components and wiring, while also acting as a mounting surface. This arrangement provides greater total cooling capacity and more rapid cooling than a typical enclosed and sealed housing. Heat sink 602 or additional heat sink 604 may be comprised of epoxy or other shapeable and curable material to enhance heat conductivity versus typical loss of cooling capacity or insulating effect caused by other assembly material and construction methods.

Various embodiments of a self-contained, headlamp, automatic brake light, and articulable battery system have been described. Embodiments include a sound-emitting device in the same system. Although the figures are generally described with reference to use of the system on a bicycle, embodiments are not so limited. The system is useful in many personal and emergency applications that benefit from such a self-contained system that is portable, articulable, and suitable for outdoor use.

What is claimed is:

1. A portable lighting system comprising:
   a power source;
   a light source that emits lights rays, the light source being coupled to and receiving power from the power source;
   a primary light shaper comprising a light shaping collimator mounted over the light source, wherein light rays emitted by the light source pass through the light shaping collimator, and wherein the light shaping collimator emits reshaped light rays; and
   a housing having interior cylindrical surfaces and a terminal end, wherein the housing houses the light source and the light shaping collimator, wherein reshaped light rays emitted by the light shaping collimator subsequently pass through the housing, wherein the interior cylindrical surfaces of the housing comprise a secondary light shaper that further reshapes light rays passing through the housing multiple times, and wherein the housing emits multiply reshaped light rays out the terminal end.

2. The portable lighting system of claim 1 further comprising:
   a lens mounted on the terminal end of the housing, wherein the multiply reshaped light rays emitted out the terminal end of the housing pass through the lens.

3. The portable lighting system of claim 2 wherein:
   the lens is mounted off-center on the terminal end of the housing, wherein the off-center lens alters refraction and projection of the multiply reshaped light rays emitted out the terminal end of the housing.

4. The portable lighting system of claim 2 wherein:
the lens is mounted off-center on the terminal end of the housing, wherein the off-center lens alters refraction and concentration of the multiply reshaped light rays emitted out the terminal end of the housing.

5. The portable lighting system of claim 2 wherein:
the lens is mounted off-center on the terminal end of the housing, wherein the off-center lens alters a shape and a field of the multiply reshaped light rays emitted out the terminal end of the housing.

6. The portable lighting system of claim 2 wherein the lens being mounted off-center on the terminal end of the housing further comprises:
a midpoint of the lens being non-concentric with a path of light rays passing through the housing.

7. The portable lighting system of claim 2 wherein the lens being mounted off-center on the terminal end of the housing further comprises:
a plane of the lens being skew from a plane of light rays passing through the housing.

8. The portable lighting system of claim 2 wherein:
the lens further comprising a magnifying lens.

9. The portable lighting system of claim 1 wherein:
the interior cylindrical surfaces of the housing further comprise fully smooth surfaces.

10. The portable lighting system of claim 1 wherein:
the interior cylindrical surfaces of the housing further comprise partially smooth surfaces.

11. The portable lighting system of claim 1 wherein:
the interior cylindrical surfaces of the housing further comprise textured surfaces.

12. The portable lighting system of claim 1 wherein:
the interior cylindrical surfaces of the housing further comprise transparent surfaces.

13. The portable lighting system of claim 1 wherein:
the interior cylindrical surfaces of the housing further comprise reflective surfaces.

14. The portable lighting system of claim 1 wherein:
the interior cylindrical surfaces of the housing further comprise photo-luminescent surfaces.

15. The portable lighting system of claim 1 wherein:
the interior cylindrical surfaces of the housing further comprise colored surfaces.

16. The portable lighting system of claim 1 wherein:
the interior cylindrical surfaces of the housing further comprise diffused surfaces.

17. The portable lighting system of claim 1 wherein:
the housing concentrates the multiply reshaped light rays emitted out the terminal end in multiple directions, thereby projecting the emitted light rays in an altered field and shape.

18. The portable lighting system of claim 1 further comprising:
wherein the portable lighting system is of a size and weight suitable for use as one from a group consisting of: a bicycle head light, a hand held light, a light mounted on hand held equipment and a light mounted on clothing.

* * * * *

UNITED STATES PATENT AND TRADEMARK OFFICE
CERTIFICATE OF CORRECTION

| | | |
|---|---|---|
| PATENT NO. | : 8,662,697 B2 | Page 1 of 1 |
| APPLICATION NO. | : 13/077894 | |
| DATED | : March 4, 2014 | |
| INVENTOR(S) | : Burr | |

It is certified that error appears in the above-identified patent and that said Letters Patent is hereby corrected as shown below:

Title Page, Item (12) delete "Burr et al." and insert --Burr--.

Title Page, Item (76) Inventors:

should read

--(76) Inventor: Barry J. Burr, Mountain View, CA (US)--.

Signed and Sealed this
Twenty-second Day of September, 2015

Michelle K. Lee
*Director of the United States Patent and Trademark Office*